United States Patent
Arena

[19]
[11] Patent Number: 6,148,472
[45] Date of Patent: Nov. 21, 2000

[54] VEHICLE CLEANING SYSTEM

[76] Inventor: Sharon P. Arena, 420 Wal-Mart Way B108, Dahlonega, Ga. 30533

[21] Appl. No.: 09/337,821

[22] Filed: Jun. 22, 1999

[51] Int. Cl.[7] .................................. A47L 9/19; A47L 5/38
[52] U.S. Cl. ................................ 15/313; 15/352
[58] Field of Search .............................. 15/313, 314, 347, 15/352, 353

[56] References Cited

U.S. PATENT DOCUMENTS

| | | | |
|---|---|---|---|
| 3,384,916 | 5/1968 | Hockin | 15/313 |
| 3,449,787 | 6/1969 | Rothstein et al. | |
| 3,500,492 | 3/1970 | Coleman | |
| 3,648,837 | 3/1972 | Ogle | 15/313 |
| 3,841,553 | 10/1974 | Taylor | |
| 3,998,385 | 12/1976 | Ogle | 15/313 |
| 4,072,097 | 2/1978 | Seibel | |
| 5,189,753 | 3/1993 | Sousa et al. | 15/313 |
| 5,454,139 | 10/1995 | Beck | |
| 5,829,091 | 11/1998 | Ingram et al. | 15/313 |

*Primary Examiner*—Terrence R. Till
*Attorney, Agent, or Firm*—Joseph N. Breaux

[57] ABSTRACT

A vehicle cleaning system that includes a vacuum system for removing large cluttering items as well as soil, pebbles and other dirt; that is mountable in a vehicle; that includes a storage mechanism for storing and compacting large items; and that includes a passenger compartment console assembly, a separator unit assembly including a compaction subassembly, a motor powered wet/dry vacuum system, a passenger vacuum line in connection between the passenger compartment console and the separator unit, and a wet/dry vacuum hose in connection between the separator unit assembly and the wet/dry vacuum system.

1 Claim, 3 Drawing Sheets

"""6,148,472"""

VEHICLE CLEANING SYSTEM

TECHNICAL FIELD

The present invention relates to vehicle cleaning systems and more particularly to a vehicle cleaning system that a passenger compartment console assembly, a separator unit assembly including a compaction subassembly, a motor powered wet/dry vacuum system, a passenger vacuum line in connection between the passenger compartment console and the separator unit, and a wet/dry vacuum hose in connection between the separator unit assembly and the wet/dry vacuum system; the passenger compartment console assembly including a console housing including a large object insertion door, a vacuum on/off switch in connection with the motor of the wet/dry vacuum system, a momentary contact compaction subassembly on/off switch in connection with the compaction subassembly, a detachable vacuum hose and nozzle fitting to which an underseat storable vacuum hose and nozzle is attachable, an underseat storable vacuum hose and nozzle, and a scent dispensing system having an activation button, one passenger compartment misting head and one console housing interior misting head; the separator unit assembly being positioned between the passenger compartment console assembly and the wet/dry vacuum system to separate large trash (such as pop cans, cups, etc.) from small items (such as dirt, grass, french fires etc.) and route the small items to the wet/dry vacuum system while trapping and then directing and compacting the large trash into a compacted trash compartment; the separator unit assembly compaction subassembly including a pivoting, gear motor driven large material capture screen, a gear motor driven retractable holding compartment door, and a compacted trash compartment; the compaction subassembly responding to activation of the momentary contact compaction subassembly on/off switch by: a) retracting the gear motor retractable holding compartment door from a closed position to expose a large trash insertion opening into the compacted trash compartment, b) pivoting the gear motor driven large material capture screen in a manner to push any large trash items through the large trash insertion opening provided by retraction of the gear motor retractable holding compartment door into the compacted trash compartment, c) pivoting the gear motor driven large material capture screen in the reverse direction to a starting point, and then finally extending the gear motor driven retractable holding compartment door back over the large trash insertion opening; a large trash accumulation indicator light being activated by a vacuum switch that is provided between the large material capture compartment and the wet/dry vacuum system to alert a user to operate the compaction subassembly; the large material capture screen starting point being in a position in-line between the passenger vacuum line and the wet/dry vacuum hose; the wet/dry vacuum system being sized to fit within the trunk compartment of a vehicle.

BACKGROUND ART

Many vehicles can become cluttered with large trash such as pop cans, bags, cups etc. as well as dirty from mud, leaves, rocks and the like. It would be a benefit, therefore, to have a vehicle cleaning system that could be used remove large cluttering items as well as to vacuum up soil, pebbles and other dirt. Because access to a cleaning system can be needed at any time, it would be a further benefit if the system could be mounted within a vehicle ready for use at a moments notice. Because constant emptying of waste containers can be bothersome, it would be a still further benefit to have such a system that included a storage mechanism for storing and compacting large items.

GENERAL SUMMARY DISCUSSION OF INVENTION

It is thus an object of the invention to provide a vehicle cleaning system that includes a vacuum system for removing large cluttering items as well as soil, pebbles and other dirt.

It is a further object of the invention to provide a vehicle cleaning system that is mountable within a vehicle.

It is a still further object of the invention to provide a vehicle cleaning system that includes a storage mechanism for storing and compacting large items.

It is a still further object of the invention to provide a vehicle cleaning system that includes a passenger compartment console assembly, a separator unit assembly including a compaction subassembly, a motor powered wet/dry vacuum system, a passenger vacuum line in connection between the passenger compartment console and the separator unit, and a wet/dry vacuum hose in connection between the separator unit assembly and the wet/dry vacuum system; the passenger compartment console assembly including a console housing including a large object insertion door, a vacuum on/off switch in connection with the motor of the wet/dry vacuum system, a momentary contact compaction subassembly on/off switch in connection with the compaction subassembly, a detachable vacuum hose and nozzle fitting to which an underseat storable vacuum hose and nozzle is attachable, an underseat storable vacuum hose and nozzle, and a scent dispensing system having an activation button, one passenger compartment misting head and one console housing interior misting head; the separator unit assembly being positioned between the passenger compartment console assembly and the wet/dry vacuum system to separate large trash (such as pop cans, cups, etc.) from small items (such as dirt, grass, french fires etc.) and route the small items to the wet dry vacuum system while trapping and then directing and compacting the large trash into a compacted trash compartment; the separator unit assembly compaction subassembly including a pivoting, gear motor driven large material capture screen, a gear motor driven retractable holding compartment door, and a compacted trash compartment; the compaction subassembly responding to activation of the momentary contact compaction subassembly on/off switch by: a) retracting the gear motor retractable holding compartment door from a closed position to expose a large trash insertion opening into the compacted trash compartment, b) pivoting the gear motor driven large material capture screen in a manner to push any large trash items through the large trash insertion opening provided by retraction of the gear motor retractable holding compartment door into the compacted trash compartment, c) pivoting the gear motor driven large material capture screen in the reverse direction to a starting point, and then finally extending the gear motor driven retractable holding compartment door back over the large trash insertion opening; a large trash accumulation indicator light being activated by a vacuum switch that is provided between the large material capture compartment and the wet/dry vacuum system to alert a user to operate the compaction subassembly; the large material capture screen starting point being in a position in-line between the passenger vacuum line and the wet/dry vacuum hose; the wet/dry vacuum system being sized to fit within the trunk compartment of a vehicle.

It is a still further object of the invention to provide a vehicle cleaning system that accomplishes all or some of the above objects in combination.

Accordingly, a vehicle cleaning system is provided. The vehicle cleaning system includes passenger compartment console assembly, a separator unit assembly including a compaction subassembly, a motor powered wet/dry vacuum system, a passenger vacuum line in connection between the passenger compartment console and the separator unit, and a wet/dry vacuum hose in connection between the separator unit assembly and the wet/dry vacuum system; the passenger compartment console assembly including a console housing including a large object insertion door, a vacuum on/off switch in connection with the motor of the wet/dry vacuum system, a momentary contact compaction subassembly on/off switch in connection with the compaction subassembly, a detachable vacuum hose and nozzle fitting to which an underseat storable vacuum hose and nozzle is attachable, an underseat storable vacuum hose and nozzle, and a scent dispensing system having an activation button, one passenger compartment misting head and one console housing interior misting head; the separator unit assembly being positioned between the passenger compartment console assembly and the wet/dry vacuum system to separate large trash (such as pop cans, cups, etc.) from small items (such as dirt, grass, french fires etc.) and route the small items to the wet/dry vacuum system while trapping and then directing and compacting the large trash into a compacted trash compartment; the separator unit assembly compaction subassembly including a pivoting, gear motor driven large material capture screen, a gear motor driven retractable holding compartment door, and a compacted trash compartment; the compaction subassembly responding to activation of the momentary contact compaction subassembly on/off switch by: a) retracting the gear motor retractable holding compartment door from a closed position to expose a large trash insertion opening into the compacted trash compartment, b) pivoting the gear motor driven large material capture screen in a manner to push any large trash items through the large trash insertion opening provided by retraction of the gear motor retractable holding compartment door into the compacted trash compartment, c) pivoting the gear motor driven large material capture screen in the reverse direction to a starting point, and then finally extending the gear motor driven retractable holding compartment door back over the large trash insertion opening; a large trash accumulation indicator light being activated by a vacuum switch that is provided between the large material capture compartment and the wet/dry vacuum system to alert a user to operate the compaction subassembly; the large material capture screen starting point being in a position in-line between the passenger vacuum line and the wet/dry vacuum hose; the wet/dry vacuum system being sized to fit within the trunk compartment of a vehicle.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
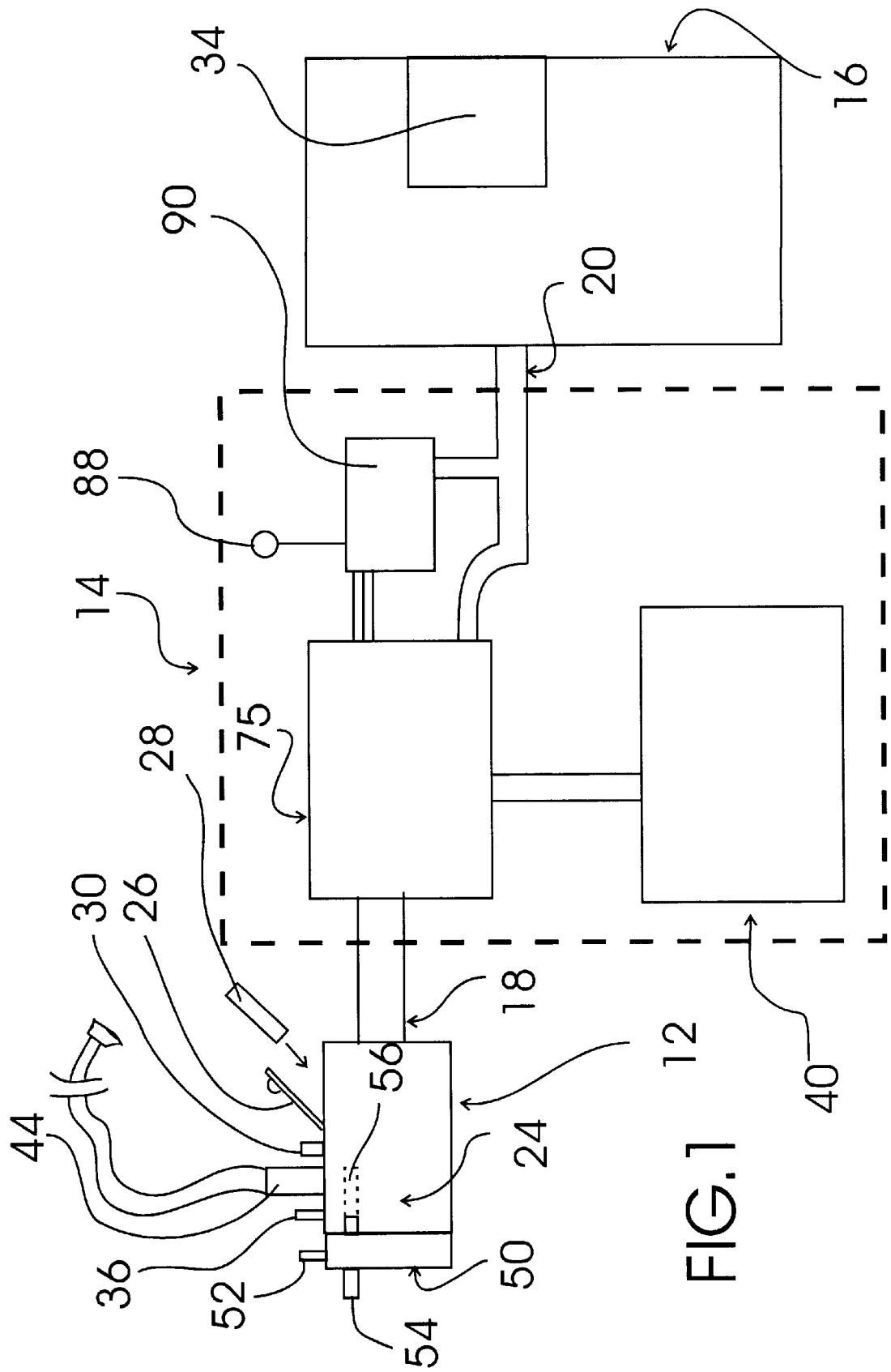
FIG. 1 is a block diagram of an exemplary embodiment of the vehicle cleaning system of the present invention showing the passenger compartment console assembly, the separator unit assembly including a compaction subassembly, the motor powered wet/dry vacuum system, the passenger vacuum line in connection between the passenger compartment console and the separator unit, and the wet/dry vacuum hose in connection between the separator unit assembly and the wet/dry vacuum system; the passenger compartment console assembly including a console housing including a large object insertion door, a vacuum on/off switch in connection with the motor of the wet/dry vacuum system, a momentary contact compaction subassembly on/off switch in connection with the compaction subassembly, a detachable vacuum hose and nozzle fitting to which an underseat storable vacuum hose and nozzle is attachable, an underseat storable vacuum hose and nozzle, and a scent dispensing system having an activation button, one passenger compartment misting head and one console housing interior misting head; the separator unit assembly being positioned between the passenger compartment console assembly and the wet/dry vacuum system to separate large trash (such as pop cans, cups, etc.) from small items (such as dirt, grass, french fires etc.) and route the small items to the wet/dry vacuum system while trapping and then directing and compacting the large trash into a compacted trash compartment; the separator unit assembly compaction subassembly including a pivoting, gear motor driven large material capture screen, a gear motor driven retractable holding compartment door, and a compacted trash compartment; the compaction subassembly responding to activation of the momentary contact compaction subassembly on/off switch by: a) retracting the gear motor retractable holding compartment door from a closed position to expose a large trash insertion opening into the compacted trash compartment, b) pivoting the gear motor driven large material capture screen in a manner to push any large trash items through the large trash insertion opening provided by retraction of the gear motor retractable holding compartment door into the compacted trash compartment, c) pivoting the gear motor driven large material capture screen in the reverse direction to a starting point, and then finally extending the gear motor driven retractable holding compartment door back over the large trash insertion opening; a large trash accumulation indicator light being activated by a vacuum switch that is provided between the large material capture compartment and the wet/dry vacuum system to alert a user to operate the compaction subassembly; the large material capture screen starting point being in a position in-line between the passenger vacuum line and the wet/dry vacuum hose; the wet/dry vacuum system being sized to fit within the trunk compartment of a vehicle.

FIG. 1 is a block diagram of an exemplary embodiment of the vehicle cleaning system of the present invention generally designated 10. Vehicle cleaning system 10 includes a passenger compartment console assembly, generally designated 12; a separator unit assembly, generally designated 14; a motor powered wet/dry vacuum system, generally designated 16; a large diameter flexible plastic passenger vacuum line, generally designated 18, in connection between passenger compartment console 12 and separator unit 14; and a wet/dry vacuum hose, generally designated 20, in connection between separator unit assembly 14 and wet/dry vacuum system 16.

Passenger compartment console assembly 12 is mounted in a vehicle passenger compartment during installation and includes a console housing, generally designated 24 including a large object insertion door 26 for receiving items such as pop cans 28 and the like; a vacuum on/off switch 30 in connection with a motor 34 of wet/dry vacuum system 16; a momentary contact compaction subassembly on/off switch 36 in connection with a compaction subassembly, generally designated 40 of separator unit assembly 14; a detachable vacuum hose and nozzle fitting 44 to which an underseat storable vacuum hose and nozzle 46 is attachable; an underseat storable vacuum hose and nozzle 46; and a scent dispensing system, generally designated 50 having an activation button 52, one passenger compartment misting head 54 and one console housing interior misting head 56.

Figure 2:
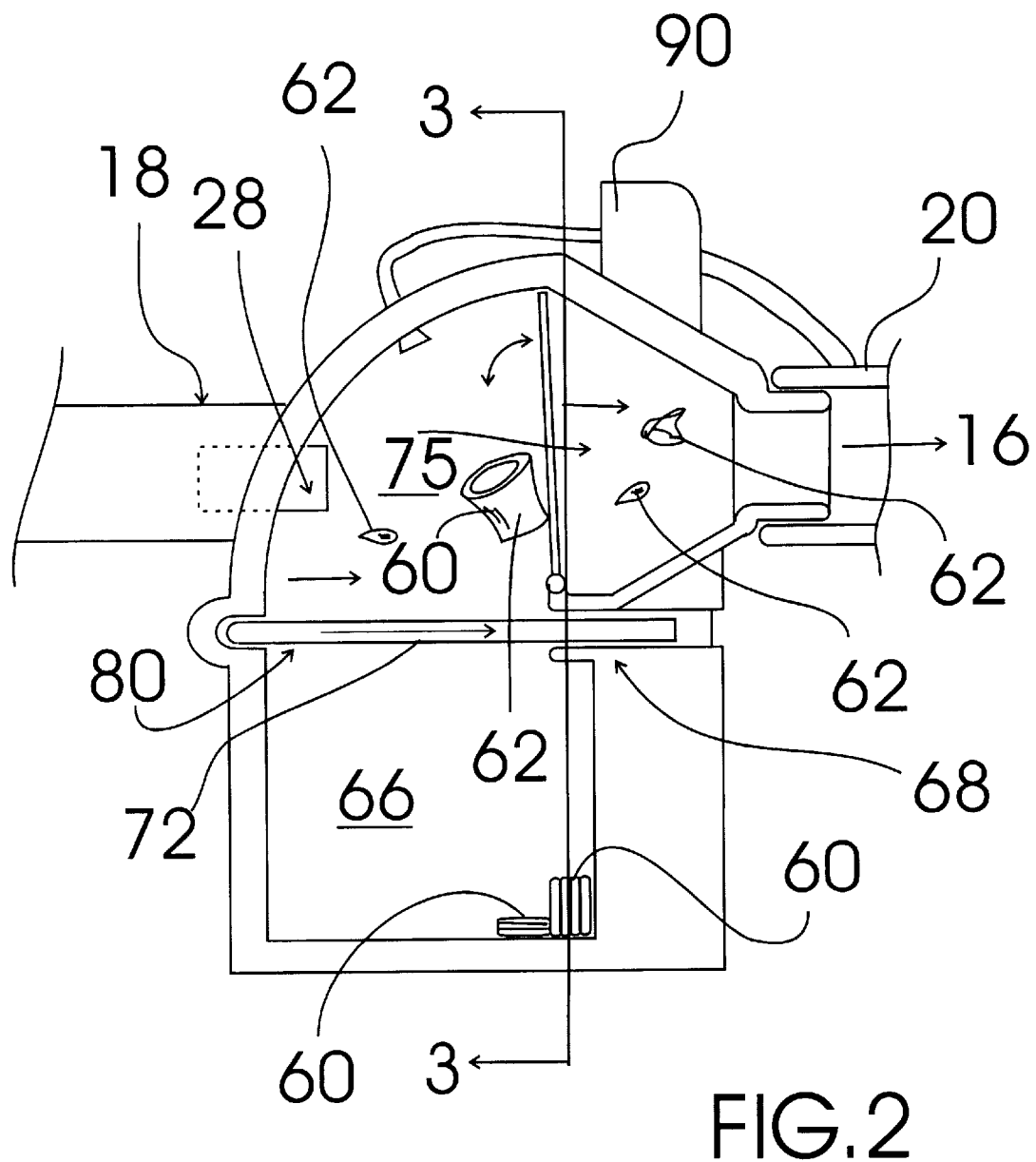
FIG. 2 is a top plan view of the separator unit assembly including the compaction subassembly with the separator unit assembly cover (shown in FIG. 3) removed to show the passenger vacuum line in connection the large material capture compartment of the separator unit; the wet/dry vacuum hose in connection with the wet/dry vacuum hose fitting of the separator unit; the pivoting, gear motor driven large material capture screen positioned between the large material capture compartment and the wet/dry vacuum hose fitting; the gear motor driven retractable holding compartment door in the closed position sealing the large trash insertion opening; the compacted trash compartment; and the vacuum switch provided between the large material capture compartment and the wet/dry vacuum system to alert a user with an alerting diode to operate the compaction subassembly; the large material capture screen starting point being in a position in-line between the passenger vacuum line and the wet/dry vacuum hose; the wet/dry vacuum system being sized to fit within the trunk compartment of a vehicle.
Figure 3:
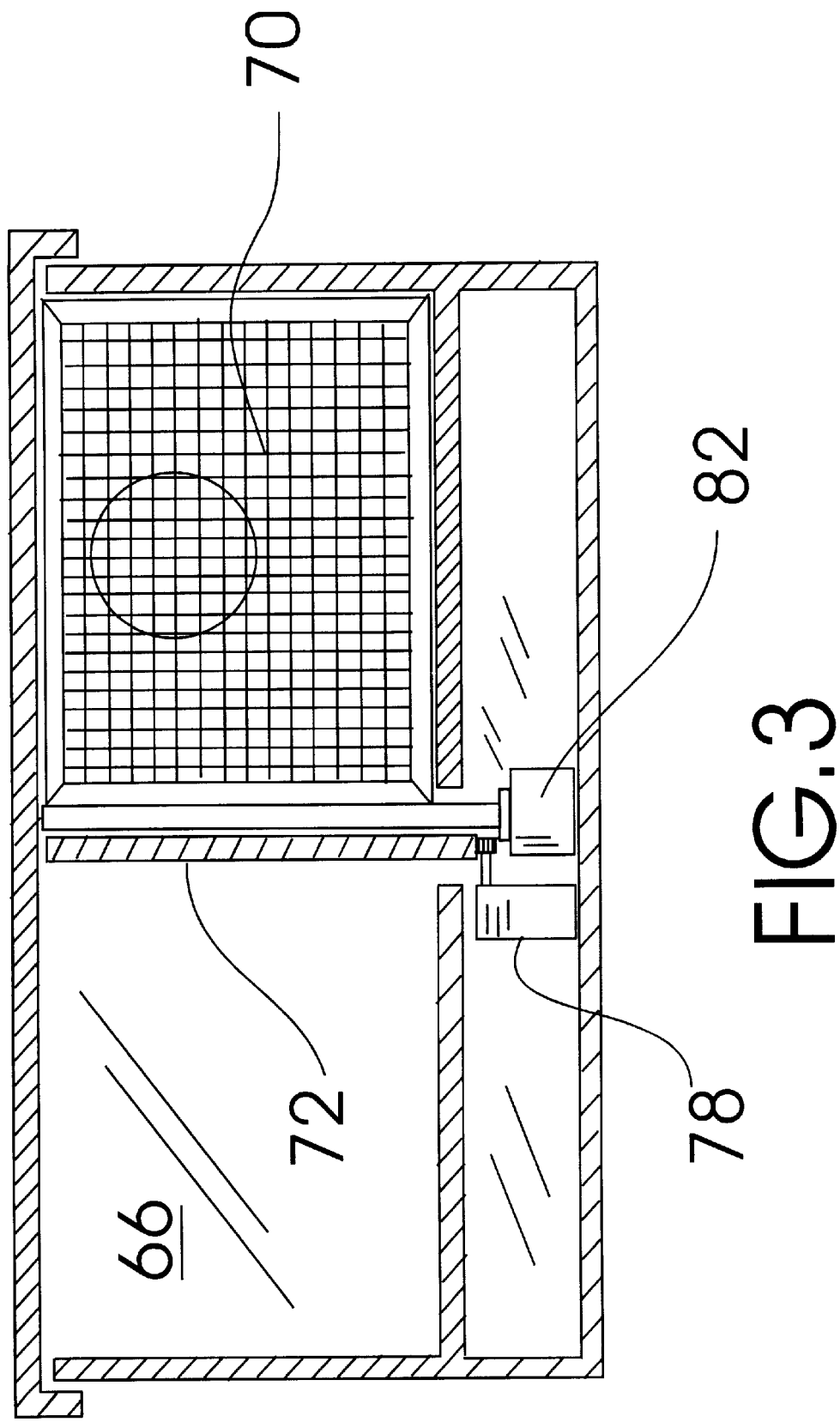
FIG. 3 is a sectional view through the separator unit assembly of FIG. 2 along the line 3—3 showing compaction subassembly cover; the opening of the passenger vacuum line in connection with the large material capture compartment; the pivoting, gear motor driven large material capture screen; the gear motor driven retractable holding compartment door in the closed position sealing the large trash insertion opening; and the compacted trash compartment.

Separator unit assembly 14 is positioned between passenger compartment console assembly 12 and a conventional twelve volt wet/dry vacuum system 16, referring now to FIG. 2, for the purpose of separating large trash 60 (such as pop cans, cups, etc.) from small items 62 (such as water droplets, dirt, grass, french fires etc.) and routing small items 62 to wet/dry vacuum system 16 while trapping and then directing and compacting large trash items 60 into a compacted trash compartment 66. Separator unit assembly compaction subassembly, generally designated 68, includes a pivoting, gear motor driven large material capture screen 70, a large material capture compartment 75; a gear motor driven retractable holding compartment door 72, and compacted trash compartment 66. Compaction subassembly 68 responds to activation of momentary contact compaction subassembly on/off switch 36 (FIG. 1) by: a) retracting gear motor retractable holding compartment door 70 with gear motor 78 (FIG. 3) from a closed position to expose a large trash insertion opening 80 into compacted trash compartment 66, b) pivoting gear motor driven large material capture screen 70 by operating gear motor 82 (FIG. 3) in a manner to push any large trash items 60 and pop cans 28 through large trash insertion opening 80 into and compacting compacted trash compartment 66, c) pivoting gear motor driven large material capture screen 70 in the reverse direction back to a starting point in-line between passenger vacuum line 18 and wet/dry vacuum hose 20. The user is notified by a diode 88 activated by a vacuum switch FIG. 1) when vacuum switch 90 detects a threshold vacuum difference between large material capture compartment 75 and wet dry vacuum hose 20 to activate compaction subassembly 68.

It can be seen from the preceding description that a vehicle cleaning system has been provided that includes a vacuum system for removing large cluttering items as well as soil, pebbles and other dirt; that is mountable in a vehicle; that includes a storage mechanism for storing and compacting large items; and that includes a passenger compartment console assembly, a separator unit assembly including a compaction subassembly, a motor powered wet/dry vacuum system, a passenger vacuum line in connection between the passenger compartment console and the separator unit, and a wet/dry vacuum hose in connection between the separator unit assembly and the wet/dry vacuum system; the passenger compartment console assembly including a console housing including a large object insertion door, a vacuum on/off switch in connection with the motor of the wet dry vacuum system, a momentary contact compaction subassembly on/off switch in connection with the compaction subassembly, a detachable vacuum hose and nozzle fitting to which an underseat storable vacuum hose and nozzle is attachable, an underseat storable vacuum hose and nozzle, and a scent dispensing system having an activation button, one passenger compartment misting head and one console housing interior misting head; the separator unit assembly being positioned between the passenger compartment console assembly and the wet/dry vacuum system to separate large trash (such as pop cans, cups, etc.) from small items (such as dirt, grass, french fires etc.) and route the small items to the wet/dry vacuum system while trapping and then directing and compacting the large trash into a compacted trash compartment; the separator unit assembly compaction subassembly including a pivoting, gear motor driven large material capture screen, a gear motor driven retractable holding compartment door, and a compacted trash compartment; the compaction subassembly responding to activation of the momentary contact compaction subassembly on/off switch by: a) retracting the gear motor retractable holding compartment door from a closed position to expose a large trash insertion opening into the compacted trash compartment, b) pivoting the gear motor driven large material capture screen in a manner to push any large trash items through the large trash insertion opening provided by retraction of the gear motor retractable holding compartment door into the compacted trash compartment, c) pivoting the gear motor driven large material capture screen in the reverse direction to a starting point, and then finally extending the gear motor driven retractable holding compartment door back over the large trash insertion opening; a large trash accumulation indicator light being activated by a vacuum switch that is provided between the large material capture compartment and the wet/dry vacuum system to alert a user to operate the compaction subassembly; the large material capture screen starting point being in a position in-line between the passenger vacuum line and the wet/dry vacuum hose; the wet/dry vacuum system being sized to fit within the trunk compartment of a vehicle.

It is noted that the embodiment of the vehicle cleaning system described herein in detail for exemplary purposes is of course subject to many different variations in structure, design, application and methodology. Because many varying and different embodiments may be made within the scope of the inventive concept (s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle cleaning system comprising:
    a passenger compartment console assembly;
    a separator unit assembly including a compaction subassembly;

a motor powered wet/dry vacuum system;

a passenger vacuum line in connection between said passenger compartment console and said separator unit; and a wet/dry vacuum hose in connection between said separator unit assembly and said wet/dry vacuum system;

said passenger compartment console assembly including a console housing including a large object insertion door, a vacuum on/off switch in connection with said motor of said wet/dry vacuum system, a momentary contact compaction subassembly on/off switch in connection with said compaction subassembly, a detachable vacuum hose and nozzle fitting to which an underseat storable vacuum hose and nozzle is attachable, an underseat storable vacuum hose and nozzle, and a scent dispensing system having an activation button, one passenger compartment misting head and one console housing interior misting head;

said separator unit assembly being positioned between said passenger compartment console assembly and said wet/dry vacuum system to separate large trash from small items and route said small items to said wet/dry vacuum system while trapping and then directing and compacting said large trash into a compacted trash compartment;

said separator unit assembly compaction subassembly including a pivoting, gear motor driven large material capture screen, a gear motor driven retractable holding compartment door, and a compacted trash compartment;

said compaction subassembly responding to activation of said momentary contact compaction subassembly on/off switch by: a) retracting said gear motor retractable holding compartment door from a closed position to expose a large trash insertion opening into said compacted trash compartment, b) pivoting said gear motor driven large material capture screen in a manner to push any large trash items through said large trash insertion opening provided by retraction of said gear motor retractable holding compartment door into said compacted trash compartment, c) pivoting said gear motor driven large material capture screen in said reverse direction to a starting point, and then finally extending said gear motor driven retractable holding compartment door back over said large trash insertion opening;

a large trash accumulation indicator light being activated by a vacuum switch that is provided between said large material capture compartment and said wet/dry vacuum system to alert a user to operate said compaction subassembly;

said large material capture screen starting point being in a position in-line between said passenger vacuum line and said wet/dry vacuum hose;

said wet/dry vacuum system being sized to fit within said trunk compartment of a vehicle.

* * * * *